(12) United States Patent
Charlet et al.

(10) Patent No.: US 7,355,787 B2
(45) Date of Patent: Apr. 8, 2008

(54) OPTICAL TRANSMISSION SYSTEM AND OPTICAL FILTER ASSEMBLY FOR SUBMARINE APPLICATIONS

(75) Inventors: Gabriel Charlet, Villiers-le-Bacle (FR); Christian Simonneau, Antony (FR); Loïc Becouarn, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 11/583,019

(22) Filed: Oct. 19, 2006

(65) Prior Publication Data

US 2007/0115539 A1   May 24, 2007

(30) Foreign Application Priority Data

Nov. 21, 2005   (EP) .................................. 05292484

(51) Int. Cl.
*H01S 3/00* (2006.01)

(52) U.S. Cl. ................ 359/341.2; 359/341.32

(58) Field of Classification Search ............. 359/341.2, 359/341.32, 337.4
See application file for complete search history.

(56) References Cited

U.S. PATENT DOCUMENTS

| 5,343,320 | A | * | 8/1994 | Anderson | ................... 398/157 |
| 5,581,397 | A | * | 12/1996 | Maki et al. | ............... 359/341.2 |
| 6,384,962 | B1 | | 5/2002 | Foursa et al. | |
| 6,388,806 | B1 | | 5/2002 | Freeman et al. | |
| 6,426,833 | B1 | * | 7/2002 | Bao | ........................ 359/341.32 |
| 6,956,693 | B2 | * | 10/2005 | Yamaguchi | .............. 359/341.2 |
| 7,088,500 | B2 | * | 8/2006 | Stephens | ................. 359/341.2 |
| 2001/0019449 | A1 | | 9/2001 | Krummich | |
| 2004/0042064 | A1 | | 3/2004 | Shieh et al. | |

FOREIGN PATENT DOCUMENTS

EP    0 647 000 A1    4/1995

* cited by examiner

*Primary Examiner*—Mark Hellner
(74) *Attorney, Agent, or Firm*—Sughrue Mion, PLLC

(57) ABSTRACT

An optical amplifier assembly for submarine applications. The optical amplifier assembly comprises: a first and a second double stage fiber amplifier with respective first and second fiber amplifiers for amplifying optical signals (OS, OS') each propagated on a respective optical fibre, said optical fibres being operated in opposite operating directions (W-E, E-W), and a common pump source comprising a plurality of pump light sources, the common pump source being coupled via a coupler as a co-propagating pump to the first and second fiber amplifiers of the first and second double stage fiber amplifiers. The proposed optical amplifier assembly further comprises a gain flattening filter between the two fiber amplifiers of the first and second double stage fiber amplifiers. Thus the proposed optical amplifier assembly presents an increased efficiency with respect to an output power at a constant pump power and allows to adjust the pump power for maintaining a given output power without excessive NF degradation.

12 Claims, 2 Drawing Sheets

OPTICAL TRANSMISSION SYSTEM AND OPTICAL FILTER ASSEMBLY FOR SUBMARINE APPLICATIONS

The invention is based on a priority application EP 05 292 484.2 which is hereby incorporated by reference.

TECHNICAL FIELD

The present invention relates to an optical amplifier assembly for submarine applications, comprising: a first and a second double stage fiber amplifier with respective first and second fiber amplifiers for amplifying optical signals each propagated on a respective optical fibre, said optical fibres being operated in opposite operating directions, and a common pump source comprising a plurality of pump light sources, the common pump source being coupled via a coupler as a co-propagating pump to the first and second fiber amplifiers of the first and second double stage fiber amplifiers.

The invention also relates to an optical transmission system for submarine applications, comprising a first optical fiber for propagating optical signals in a first operating direction and a second optical fiber for propagating optical signals in a second operating direction opposite to the first operating direction.

BACKGROUND OF THE INVENTION

In current optical amplifier assemblies for use in submarine applications, a Gain Flattening Filter (GFF) is inserted at the output of the second fiber amplifier of the individual double stage fiber amplifiers comprised in the optical amplifier assembly in order to flatten the gain of the double stage fiber amplifier without degradation of the noise figure (NF) of the amplifiers. In this case, however, the output power of the double stage fiber amplifier is reduced by the filter (insertion loss).

If high gain (>16 dB) and wide transmission bandwidth (27 nm or more) are considered, the induced insertion loss due to prior art optical amplifier assemblies becomes extremely large. Thus, in the prior art, the output power of optical amplifier assemblies, i.e. of the individual double stage fiber amplifiers comprised therein, is limited to only moderate power levels. Alternatively, pump power required to reach higher output power levels becomes extremely high, such that an excessively large number of pump light sources, e.g. laser diodes, has to be employed which leads to a reduced cost-effectiveness of the overall system.

For future applications, it is expected that the span length, i.e. the distance between successive optical amplifier assemblies in submarine optical transmission systems (and thus a corresponding span loss), will continue to increase in order to achieve a reduction of the number of amplifiers in the transmission system, leading to a reduced total system cost. In addition, an upcoming generation of optical fibres with extremely large effective areas (up to 200 $\mu m^2$) could be responsible for an increase in span loss of about 4 dB, which will have to be compensated by means of a corresponding EDFA output power increase in order to maintain the performance characteristics of current optical transmission systems.

Furthermore, an increase in system bandwidth to 32 nm or even 38 nm has to be expected in the future. As a result to these system modifications, induced losses of the GFF will increase drastically. However, for the reasons indicated above, it will not be possible to increase the output power of prior art optical amplifier assemblies accordingly.

The majority of submarine optical transmission systems in use today have relatively moderate span losses (maximum 15 dB), and some of them have a wide bandwidth (27 nm). Systems with shorter reach and corresponding higher span loss (up to 30 dB) use narrow bandwidth amplifiers (<17 nm) and do not require gain flattening filters. In the context of the present invention, if one considers high span losses in connection with wide bandwidth amplifiers, a solution proposed in prior art transmission systems is to increase the pump power by several decibels in order to compensate the extra loss of the GFF, or to use amplifiers with only low output power, which obviously does not lead to an optimum system performance. However, if the output power of amplifiers used in optical transmission systems is too low, the overall system performance can only be increased to an acceptable level by adding additional amplifiers to the system in order to reduce span loss. Such an approach, however, will lead to an increase in overall system costs. On the other hand, increasing the output power by providing powerful pump light sources suffers from the fact, that pump power higher than 500 mW is not available. Simply providing an ever increasing number of individual pump light sources will again have a negative effect on overall system cost.

SUMMARY OF THE INVENTION

It is the object of the present invention to provide an optical amplifier assembly for submarine applications which provides high output power while obviating the above-mentioned disadvantages without suffering from NF degradation.

It is further an object of the present invention to provide an optical transmission system for submarine applications, which operates at high span losses and wide bandwidth without suffering from excessive overall system costs.

According to a first aspect of the present invention the object is achieved by providing an optical amplifier assembly for submarine applications, comprising: a first and a second double stage fiber amplifier with respective first and second fiber amplifiers for amplifying optical signals each propagated on a respective optical fibre, the optical fibres being operated in opposite operating directions, and a common pump source comprising a plurality of pump light sources, the common pump source being coupled via a coupler as a co-propagating pump to the first and second fibre amplifiers of the first and second double stage fiber amplifiers, the optical amplifier assembly further comprising a gain flattening filter between the two fiber amplifiers of the first and second double stage fiber amplifiers. The coupler may be devised as a standard coupler, a polarization beam combiner, or any type of multiplexer, in particular a wavelength multiplexer, all of which will are referred to by the generic term "coupler" for the sake of simplicity.

According to a second aspect of the present invention, the object is also achieved by providing an optical transmission system of the above-mentioned type, wherein said optical transmission system comprises at least one optical amplifier assembly in accordance with the first aspect of the present invention.

As a general idea, the present invention proposes to use a double stage fibre amplifier architecture with a GFF inserted between the two amplifier stages. This particular approach further enables a variety of pump power splitting schemes between the two amplifier stages in order to guarantee a submarine reliability of the overall system by providing a possibility of optimising pump power injection between the first and second amplifier stages in order to achieve various gain and output power characteristics.

In an embodiment of the optical amplifier assembly in accordance with the present invention the common pump source comprises a number of pump field combiners in operative connection with the coupler adapted to multiplex the plurality of pump light sources. Preferably, the pump light sources are devised as laser diodes and the pump field combiners are devised as polarisation beam combiners (PBC). In this way, a large number of individual pump light sources can effectively be coupled to the amplifier stages thus increasing the reliability of the overall system, which is an important feature for submarine applications. In addition, use of polarisation beam combiners effectively reduces polarisation dependent gain (PDG) in the optical transmission system.

In further embodiments of the optical amplifier assembly in accordance with the present invention the coupler is a star coupler adapted to inject the same pump power into the first and second fiber amplifiers of the first and second double stage fibre amplifiers. In this way, a pump power splitting ratio of 50:50 can be implemented.

In order to be able to vary a pump power input to the first and second stages of the double stage fiber amplifiers, in another embodiment of the optical amplifier assembly in accordance with the present invention the pump source is coupled via said coupler to a first and a second splitter having a predefined splitting ratio, wherein the first splitter couples pump light at said predefined splitting ratio into the first and second fiber amplifiers of the first double stage fiber amplifier and the second splitter couples pump light at said predefined splitting ratio into the first and second fibre amplifiers of the second double stage fiber amplifier. Alternatively, the first and second splitters could have different splitting ratios, hereinafter also referred to as "pump power splitting ratios". However, as submarine systems are usually purely symmetrical, normally equal splitting ratios for the East West direction and the West East direction are used. In a preferred further embodiment of the optical amplifier assembly in accordance with the present invention the said couplers are devised in the form of fused fiber couplers. In this way, various pump power splitting ratios can be easily realised.

However, in order to achieve application-specific gain and power output characteristics, in a preferred embodiment of the optical amplifier assembly in accordance with the present invention said coupler is preferably a 3 dB-coupler and the predefined splitting ratio in the first and second double stage fiber amplifiers in the respective operating direction is defined as a pump power splitting ratio in favour of the first fiber amplifier, preferably of 70:30. In a more general way, the predefined splitting ratio is defined such that the available pump power is split between the two stages of the respective double stage fiber amplifiers in favour of the first fibre amplifier, i.e. the first amplifier stage.

Alternatively—especially when large gain and high output power are required—the largest part of the injected pump power should be sent into the second stage of the double stage fiber amplifiers. Therefore, in a further embodiment in accordance with the present invention said coupler is preferably a 3 dB-coupler and the predefined splitting ratio in the first and second double stage fiber amplifiers in the respective operating direction is defined as a pump power splitting ratio in favour of the second fibre amplifier, preferably a splitting ratio of 70:30.

Since the individual fiber amplifier stages in the double stage fiber amplifiers are preferably devised in the form of Erbium doped fiber amplifiers (EDFAS) the above-described pump power ratio for particular gain and/or pump power levels has to be determined by taking into account a distribution of a combined fiber length of the first and second fiber amplifiers on the two amplifier stages. Therefore, in another embodiment of the optical amplifier assembly in accordance with the present invention the first fiber amplifier in the first and second double stage amplifiers in the respective operating direction is has a longer fiber length than the second fibre amplifier in the respective operating direction, wherein said first fiber amplifier preferably constitutes 70% of the combined fiber length of the first and second fibre amplifiers. In this context, the terms "first/second fiber amplifier in the operating direction" denotes the particular amplifier stage in a double stage fiber amplifier which is encountered first/second by an optical signal propagating in said operating direction.

Alternatively, in another embodiment of the optical amplifier assembly in accordance with the present invention, the first and second fiber amplifiers in a given double stage amplifier have an equal fiber length, and in yet another embodiment of the optical amplifier assembly in accordance with the present invention the first fibre amplifier in the respective operating direction has a shorter fiber length than the second fiber amplifier in the respective operating direction, wherein said first fibre amplifier preferably constitutes 30% of the combined fiber length of the first and second fiber amplifiers.

In order to further enhance pump saving possibilities and/or output power, in a corresponding further embodiment of the optical amplifier assembly in accordance with the present invention the first and second double stage fiber amplifiers comprise bypass means adapted to inject a residual pump power from the first fiber amplifier with respect to the operating direction to the second fiber amplifier with respect to the operating direction as a contra-propagating pump. The pump power (at a wavelength of 980 nm) is used to excite Erbium ions. Then Erbium ions transfer their energy to signal photons at a wavelength of about 1550 nm. When the signal at 1550 nm is high, the Erbium ions transfer their energy quickly to the 1550 nm signal and thus can absorb more 980 nm pump power. Due to attenuation, the pump power within the fiber decreases with the Erbium doped fiber length, such that after 10 m, the pump power is lower than after 1 m. Thus, if the Erbium fiber length is too short, or if the pump power is too high, or also if the signal power is too low, the pump power at the output of the first EDFA stage is not negligible. This pump power is called the "residual pump power" at the output of the first stage. This 980 nm pump power can be demultiplexed and then reinjected into the second stage to increase the pump efficiency. Also, a high residual pump power could be problematic as the 980 nm power is not transmitted by the isolator at the output of the amplifier and could heat the isolator and degrade it.

Further advantages and characteristics of the present invention can be gathered from the following description of preferred embodiments with reference to the enclosed drawings. Features mentioned above as well as below can be used in accordance with the invention either individually or in conjunction. The embodiments mentioned are not to be understood as an exhaustive enumeration but rather as examples with regard to the underlying concept of the present invention.

DETAILED DESCRIPTION OF PREFERRED EMBODIMENTS

Figure 1:
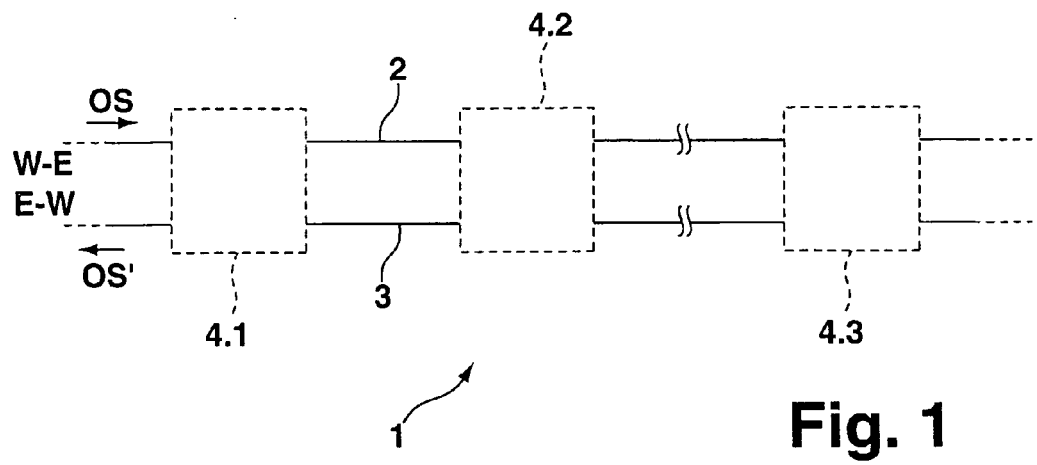
FIG. 1 is schematic block diagram of an optical transmission system in accordance with the present invention comprising optical amplifier assemblies in accordance with another aspect of the present invention.

The following detailed description of the invention refers to the accompanying drawings. The same reference numerals can be used in different drawings to identify same or similar elements.

FIG. 1 shows a schematic block diagram of an optical transmission system 1 for submarine applications in accordance with an aspect of the present invention. The optical transmission system 1 comprises a first optical fiber 2 and a second optical fibre 3. The first optical fiber 2 is adapted to propagate optical signals OS in a respective first operating direction W-E, as indicated by the arrow in FIG. 1. The second optical fiber 3 is adapted to propagate optical signals OS' in a second operating direction E-W opposite to said first operating direction, as indicated by the arrow in FIG. 1. For submarine applications, said first optical fiber 2, can be identified with a west-east fibre/cable, whereas said second optical fiber 3 can be identified with an east-west fibre/cable. In order to compensate a span loss of optical signals OS, OS' in optical transmission systems 1 of the above-described type a plurality of optical amplifier assemblies 4.1-4.3 are generally arranged on the optical fibres 2, 3.

In order to achieve high amplifier gain (possibly at relatively wide system bandwidths of the order of 32 nm to 38 nm) and/or save pump power required for optical amplifiers comprised in the optical amplifier assemblies 4.1-4.3, the present invention proposes to use optical amplifier assemblies which will now be described in detail with reference to appended FIGS. 2 to 4.

Figure 2:
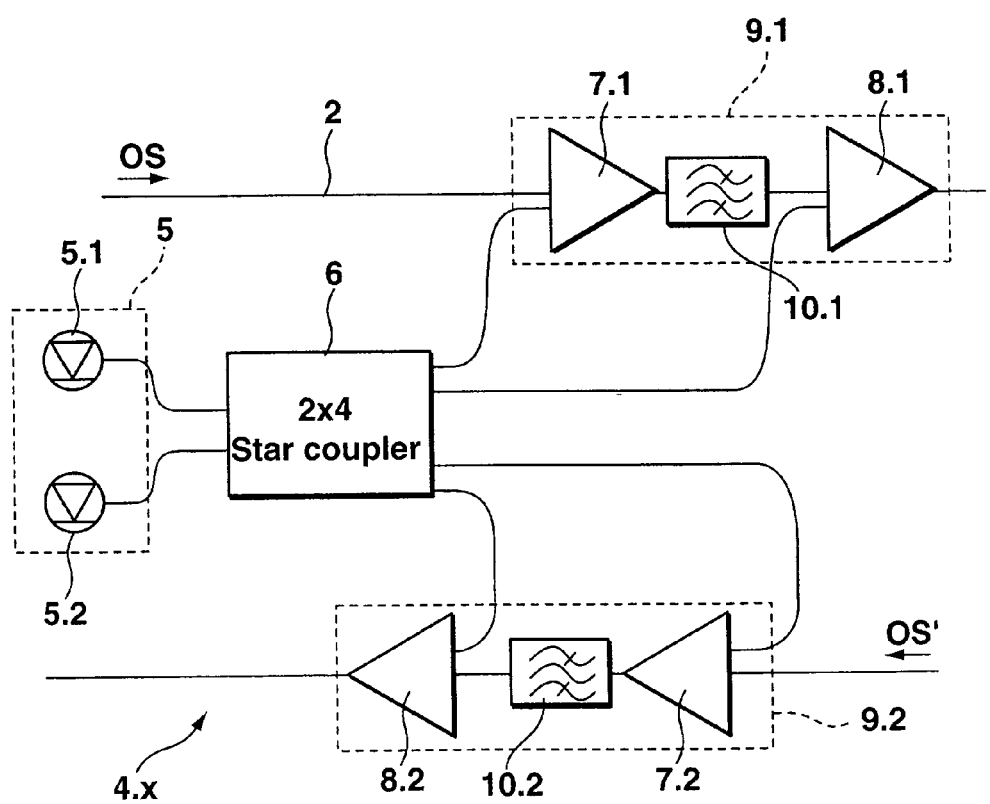
FIG. 2 is a block diagram of a first embodiment of the optical amplifier assembly in accordance with the present invention.

FIG. 2 shows a block diagram of a first embodiment of the optical amplifier assembly in accordance with the present invention. In order to comply with the above-described illustration in FIG. 1, the optical amplifier assembly of FIG. 2 has been assigned reference numeral 4.x, wherein reference numeral 4.x replaces reference numerals 4.1-4.3 of FIG. 1 in a generic way.

The optical amplifier assembly 4.x of FIG. 2 comprises two pump light sources 5.1, 5.2, e.g. laser diodes, which effectively form a common pump source 5 as indicated by a dashed box in FIG. 2. The pump light sources 5.1, 5.2 are operably connected with a star coupler 6, which couples the common pump source 5, i.e. the individual pump light sources 5.1, 5.2 to respective first 7.1, 7.2 and second fiber amplifiers 8.1, 8.2 arranged on the first optical fiber 2 and on the second optical fiber 3, respectively, for amplifying the optical signals OS, OS' propagated thereon. As depicted in FIG. 2, the first fiber amplifier 7.1 and the second fiber amplifier 8.1 arranged on the first optical fiber 2 form a first double stage fiber amplifier 9.1, as indicated in FIG. 2 by means of a dashed box. Correspondingly, the first fiber amplifier 7.2 and a second amplifier 8.2 arranged on the second optical fiber 3 form a second double stage fibre amplifier 9.2. Between the two fiber amplifiers 7.1, 8.1 and 7.2, 8.2, respectively, of the first and second double stage fiber amplifiers 9.1, 9.2, the optical amplifier assembly 4.x comprises a gain flattening filter (GFF) 10.1, 10.2. The designation of first and second fiber amplifiers in said first 9.1 and second 9.2 double stage fibre amplifiers is done with respect to the direction of propagation of the respective optical signals OS, OS', i.e., the respective first fiber amplifiers 7.1, 7.2 are arranged in front of the corresponding second fiber amplifiers 8.1, 8.2 with respect to the propagation direction of the optical signals OS, OS'.

In the embodiment of FIG. 2, coupler 6 is devised as a 2×4 star coupler adapted to inject a same amount of pump power from the common pump source 5 into each one of the first and second fiber amplifiers 7.1, 7.2, 8.1, 8.2 of the first and second double stage fiber amplifiers 9.1, 9.2.

In the above-described embodiment of the optical amplifier assembly in accordance with the present invention, the position of the GFFs 10.1, 10.2 within the respective double stage fiber amplifiers 9.1, 9.2 has been optimised with respect to the prior art in order to increase an efficiency of the amplifier assembly, i.e. increased output power at constant pump power or reduced pump power while keeping the same output power, without penalising degradation of the noise figure (NF) of the optical amplifier assembly.

Figure 3:
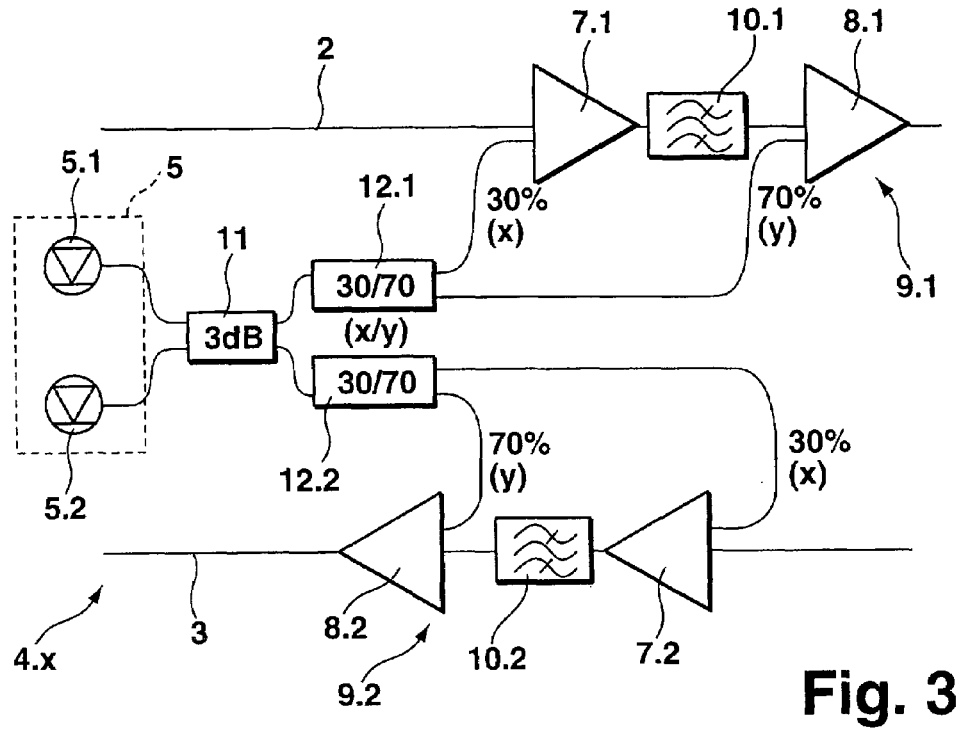
FIG. 3 is a block diagram of a second embodiment of the optical amplifier assembly in accordance with the present invention.

FIG. 3 shows a block diagram of a second embodiment of the optical amplifier assembly 4.x in accordance with the present invention. The embodiment of FIG. 3 differs from the above-described embodiment of FIG. 2 in that a ratio of pump powers injected into the first and second fiber amplifiers of the first and second double stage fibre amplifiers are not equal. In particular, the pump power injected into the second fibre amplifiers 8.1, 8.2, i.e. the respective second stages of the double stage fibre amplifiers 9.1, 9.2, can be increased at the expense of the pump power injected into the respective first stages 7.1, 7.2. This solution is of particular interest when very large gains (>20 dB) are considered.

In the embodiment of FIG. 3 the optical amplifier assembly 4.x comprises two pump light sources 5.1, 5.2 forming a common pump source 5, which are coupled to a 3 dB-coupler, i.e. a 50:50 splitter 11. The 3 dB-coupler 11 evenly distributes the pump power of the common pump source 5 between two splitters 12.1, 12.2. The splitters 12.1, 12.2 have a predefined splitting ratio x/y, and can be devised as fused fibre couplers. In the embodiment of FIG. 3, said predefined splitting ratio of splitters 12.1, 12.2 is defined as x/y=30:70. The outputs of splitters 12.1, 12.2 are connected with respective stages of the first and the second double stage fibre amplifiers 9.1, 9.2, respectively, such that the respective first fiber amplifiers 7.1, 7.2 receive x % (30%) of the pump power arriving at the respective splitter 12.1, 12.2 and that the respective second fiber amplifiers 8.1, 8.2 receive y % (70%) of the pump power arriving at the respective splitter 12.1, 12.2.

If larger output power (or higher reliability owing to increased redundancy) is required, a configuration with a higher number of pump light sources, e.g. four pump light sources instead of two, can also be used.

Figure 4:
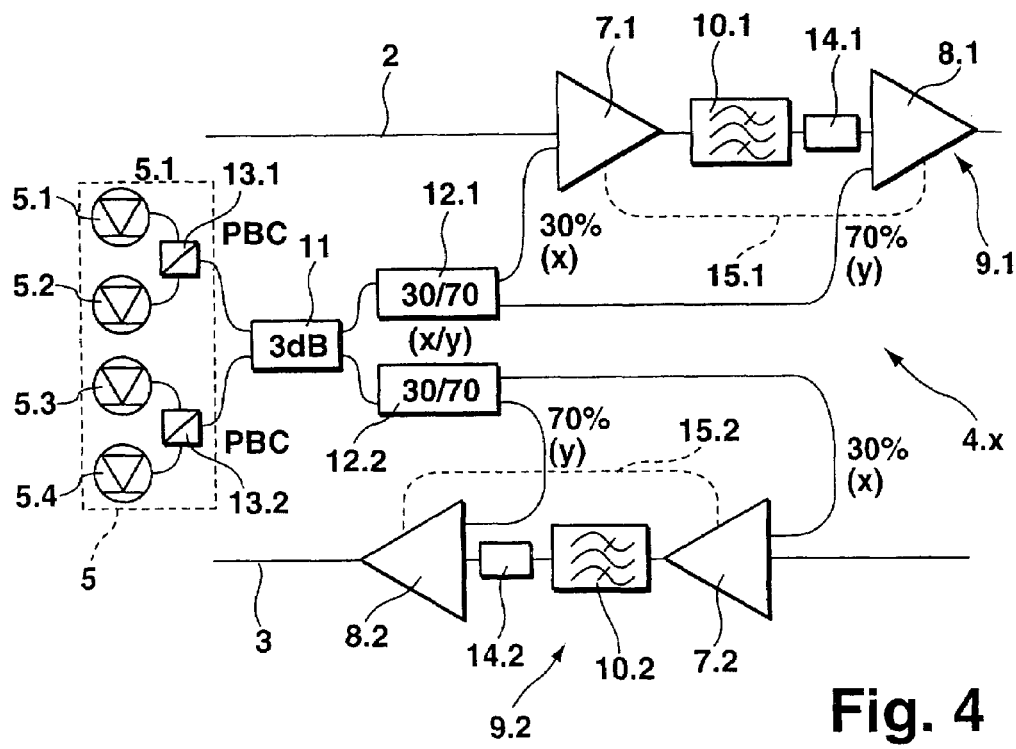
FIG. 4 is a block diagram of a third embodiment of the optical amplifier assembly in accordance with the present invention.

FIG. 4 shows a block diagram of another embodiment of the optical amplifier assembly 4.x in accordance with the present invention. The embodiment of FIG. 4 differs from the above-described embodiment of FIG. 3 in that the common pump source 5 comprises four individual pump light sources 5.1-5.4, wherein pairs of pump light sources 5.1/5.2, 5.3/5.4 are coupled to a respective pump field combiner 13.1, 13.2, preferably in the form of a polarisation beam splitter (PBC). In analogy to the embodiment of FIG. 3, respective polarisation combined outputs of the pump field combiners 13.1, 13.2 are coupled to a 3 dB-coupler 11.

This particular embodiment allows to multiplex the four pump light sources 5.1-5.4 and achieves the possibility to realise a non-equal power repartition between the individual stages of the double stage fiber amplifiers 9.1, 9.2 in analogy to the description of the embodiment of FIG. 3 above.

Furthermore, the embodiment of FIG. 4 differs from the above-described embodiment of FIG. 3 in that a gain tilt compensating means 14.1, 14.2 is comprised in the first and second double stage fiber amplifiers 9.1, 9.2, respectively, wherein said gain tilt compensating means 14.1, 14.2 can be devised as either a variable optical attenuator (VOA) or as an active tilter and is arranged in the interstage, i.e. between the respective first and second amplifier stages 7.1, 7.2 and 8.1, 8.2. The gain tilt compensating means 14.1, 14.2 can be used to compensate either ageing or repairs of the optical transmission system 1 (FIG. 1). Due to ageing or system repairs, the overall system loss increases and induces gain tilt which will deteriorate the performance of the optical transmission system. In the embodiment of FIG. 4, tilt can be compensated by adjusting the attenuation of the VOA or by the action of the active tilter. It is understood that the gain tilt compensating means 14.1, 14.2 may be located before or after the GFFs 10.1, 10.2.

In addition, the VOA or tilter relaxes the manufacturing constraint on the individual fibre amplifiers 7.1, 7.2, 8.1, 8.2 comprised in the double stage fiber amplifiers 9.1, 9.2. The individual fiber amplifiers are preferably devised as Erbium doped fibre amplifiers (EDFAs), thus in case the Erbium doped fiber has not been adjusted at the required length for to generate a flat gain, this can also be compensated by means of the gain tilt compensating means 14.1, 14.2.

In another embodiment of the optical amplifier assembly in accordance with the present invention there is further provided a bypass 15.1, 15.2 in the respective first and second double stage fiber amplifiers 9.1, 9.2 for injecting a residual pump power present at the output of the respective first amplifier stages 7.1, 7.2 as a contra-propagating pump into the respective second stages 8.1, 8.2 of the first and second double stage fiber amplifiers 9.1, 9.2, as indicated by means of dashed lines in FIG. 4. The significance of this particular embodiment will become apparent later.

As has been detailed above with reference to FIGS. 3 and 4, various non-equal pump power repartitions can be realised between the first and second amplifier stages of the respective first and second double stage fiber amplifiers. In order to achieve optimum system gain and/or a reduction of total required pump power, the power repartition scheme, i.e. the actual numerical configuration of the splitting ratios x/y of the splitters 12.1, 12.2, have to be adjusted according to an internal configuration of the respective amplifier stages of the first and second double stage fiber amplifiers 9.1, 9.2, i.e., in case of EDFAs according to the respective lengths of the Erbium doped fiber inside a given fiber amplifier 7.1, 7.2, 8.1, 8.2.

In a first case, an optical transmission system 1 (FIG. 1) with a large span loss, i.e. a loss in optical signal power of 25 dB between two successive optical amplifier assemblies 4.x on the optical fibres 2, 3, and a 32 nm bandwidth of the individual optical amplifiers (1535 nm-1567 nm) has been simulated using a property software of the applicant, wherein the optical amplifier assemblies were defined to have a target output power of 21 dBm. The number of profitable system architectures found has been further limited by imposing that the noise figure (NF) of the individual fibre amplifiers (EDFAs) should not increase by more than 0.1 dB compared with the prior art while achieving a large saving with respect to the required pump power. Following Table 1 lists pump saving percentages as a function of a fiber length L1 of the first amplifier stages 7.1, 7.2 and a fiber length L2 of the second amplifier stages 8.1, 8.2 of the respective first and second double stage fiber amplifiers 9.1, 9.2 as a percentage of a total combined fiber length L of the first and second amplifier stages for each double stage fiber amplifier 9.1, 9.2. The results in Table 1 were obtained with a pump power splitting ratio between associated first and second amplifier stages of 50:50. As can be gathered from Table 1, pump saving is highest when a residual pump power at the output of first amplifier stage 7.1, 7.2 is injected as a contra-propagating pump into the respective second amplifier stage 8.1, 8.2 by means of the bypass 15.1, 15.2 as shown in FIG. 4.

TABLE 1

| Pump saving [%] | L1/L [%] | L2/L [%] | comment |
| --- | --- | --- | --- |
| 36 | 30 | 70 | High residual pump power at the output of the first stage |
| 38.3 | 70 | 30 | |
| 39.7 | 50 | 50 | |
| 47.5 | 30 | 70 | Residual pump power injected to second stage as contra-pump with bypass |

Table 2 lists a result obtained with an embodiment of the optical amplifier assembly in accordance with the present invention, wherein the splitting pump ratio between respective first and second stages is 30:70. In that particular case—as can be gathered from Table 2—only one particular architecture was found to reach the above-mentioned noise figure target.

TABLE 2

| Pump saving [%] | L1/L [%] | L2/L [%] | comment |
| --- | --- | --- | --- |
| 47.8 | 50 | 50 | |

In a second case, a 20 dB span loss of the optical transmission system 1 (FIG. 1) has been considered in connection with an amplifier bandwidth of 32 nm and an output power of 18 dBm. In that particular case only one particular architecture has been found to reach the imposed noise figure target, i.e., the pump power splitting ratio between respective first and second stages of the double stage fiber amplifiers should be defined as 70:30 in favour of the first amplifier stages 7.1, 7.2. The correspondingly results are given in following Table 3.

TABLE 3

| Pump saving [%] | L1/L [%] | L2/L [%] | comment |
| --- | --- | --- | --- |
| 20.5 | 50 | 50 | |
| 20.5 | 70 | 30 | |

In the last configuration, pump power saving is not very sensitive to the fiber length ratio between first and second amplifier stages in a given double stage fiber amplifier in accordance with the present invention. However, the fiber length L1 of the first stage should at least be equal to the fiber length L2 of the second stage in order to minimise noise figure degradation.

Referring to the proposed embodiments of the present invention, the required pump power can be drastically reduced to obtain the same output power than in previous optical transmission system architectures. Alternatively, the output power of optical amplifier assemblies for submarine applications can be increased in comparison to the prior art while maintaining the same pump power of the individual pump light sources. If the overall system is limited by optical signal-to-noise ratio (OSNR) and not by non-linear effects (which can be the case for submarine systems with very long span), the system performance is improved, since the output power improvement is much larger than a possibly associated NF degradation.

The invention claimed is:

1. An optical amplifier assembly for submarine applications, comprising:
   first double stage amplifier having first and second fiber amplifiers for carrying optical signals propagating on a first optical fiber in a first direction, and second double stage amplifier having first and second fiber amplifiers for amplifying optical signals propagating on a second optical fiber in a second direction opposite said first direction, and
   a common pump source comprising a plurality of pump light sources, the common pump source being coupled via a coupler to said first and second fiber amplifiers of each of said first and second double stage amplifiers,
   said optical amplifier assembly further comprising a gain flattening filter [GFF] between the first and second fiber amplifiers of each of the first and second double stage amplifiers,
   wherein the common pump source is individually coupled as a co-propagating pump to the first and second fiber amplifiers of each of the first and second double stage amplifiers.

2. The optical amplifier assembly according to claim 1, wherein the common pump source comprises a number of pump field combiners cooperating with the coupler to multiplex the plurality of pump light sources.

3. The optical amplifier assembly according to claim 1, wherein the coupler is a star coupler adapted to inject the same pump power into the first and second fiber amplifiers of the first and second double stage amplifiers.

4. The optical amplifier assembly according to claim 1, wherein the common pump source is coupled via said coupler to a first and a second splitter having a predefined splitting ratio, wherein the first splitter couples pump light at said predefined splitting ratio into the first and second fiber amplifiers of the first double stage amplifier and the second splitter couples pump light at said predefined splitting ratio into the first and the second fiber amplifiers of the second double stage amplifier.

5. The optical amplifier assembly according to claim 4, wherein the predefined splitting ratio in the first and second double stage amplifiers in the respective operating direction is defined as a pump power splitting ratio in favor of the first fiber amplifier, preferably as a splitting ratio of 70:30, wherein said coupler is preferably a 3 dB-coupler.

6. The optical amplifier assembly according to claim 4, wherein the predefined splitting ratio in the first and second double stage amplifiers in the respective operating direction is defined as a pump power splitting ratio in favor of the second fiber amplifier, preferably as a splitting ratio of 70:30, wherein said coupler is preferably a 3 dB-coupler.

7. The optical amplifier assembly according to claim 1, wherein the first fiber amplifier in the first and second double stage amplifiers in the respective operating direction has a longer fiber length than the second fiber amplifier, wherein said first fiber amplifier preferably constitutes 70% of a combined fiber length of the first and second fiber amplifiers.

8. The optical amplifier assembly according to claim 1, wherein the first and second fiber amplifiers have an equal fiber length.

9. The optical amplifier assembly according to claim 1, wherein the first fiber amplifier in the first and second double stage amplifiers in the respective operating direction has a shorter fiber length than the second fiber amplifier, wherein said first fiber amplifier preferably constitutes 30% of a combined fiber length of the first and second fiber amplifiers.

10. The optical amplifier assembly according to claim 1, wherein the first and second double stage amplifiers comprise a gain tilt compensating means, in particular a variable optical attenuator or an active gain filter, between the first and second fiber amplifiers.

11. The optical amplifier assembly according to claim 1, wherein the first and second double stage amplifiers comprise bypass means adapted to inject a residual pump power from the first fiber amplifiers with respect to the operating direction to the second fiber amplifiers with respect to the operating direction as a contra-propagating pump.

12. An optical transmission system for submarine applications, comprising:
    a first optical fiber for carrying optical signals propagating in a first operating direction,
    a second optical fiber for carrying optical signals propagating in a second operating direction opposite to the first operating direction, and
    at least one optical amplifier assembly in accordance with claim 1.

* * * * *